US008484465B1

(12) United States Patent
Reis et al.

(10) Patent No.: US 8,484,465 B1
(45) Date of Patent: Jul. 9, 2013

(54) HETEROGENEOUS VIRTUAL MACHINES SHARING A SECURITY MODEL

(75) Inventors: Charles Reis, Seattle, WA (US); Adam Barth, Stanford, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/313,569

(22) Filed: Dec. 7, 2011

Related U.S. Application Data

(60) Provisional application No. 61/421,162, filed on Dec. 8, 2010.

(51) Int. Cl.
*H04L 29/06* (2006.01)

(52) U.S. Cl.
USPC .............. 713/167; 713/164; 726/11; 718/1

(58) Field of Classification Search
USPC ................... 713/164, 167; 726/11; 718/1
See application file for complete search history.

(56) References Cited

U.S. PATENT DOCUMENTS

| | | | | |
|---|---|---|---|---|
| 6,766,515 | B1* | 7/2004 | Bitar et al. | 718/100 |
| 7,350,194 | B1* | 3/2008 | Alpern | 717/124 |
| 7,594,234 | B1* | 9/2009 | Dice | 718/108 |
| 8,069,447 | B2* | 11/2011 | Jacobs et al. | 718/105 |
| 2002/0059358 | A1* | 5/2002 | Kanamori | 709/107 |
| 2003/0163479 | A1* | 8/2003 | Mathews et al. | 707/102 |
| 2004/0025171 | A1* | 2/2004 | Barinov et al. | 719/318 |
| 2005/0102670 | A1* | 5/2005 | Bretl et al. | 718/1 |
| 2006/0136720 | A1* | 6/2006 | Armstrong et al. | 713/164 |
| 2006/0277289 | A1* | 12/2006 | Bayliss et al. | 709/223 |
| 2007/0294689 | A1* | 12/2007 | Garney | 718/1 |
| 2008/0162877 | A1* | 7/2008 | Altman et al. | 712/34 |
| 2008/0313648 | A1* | 12/2008 | Wang et al. | 719/315 |
| 2009/0100345 | A1* | 4/2009 | Miller | 715/738 |
| 2009/0204963 | A1* | 8/2009 | Swart et al. | 718/1 |
| 2010/0115291 | A1 | 5/2010 | Buer | |
| 2010/0268694 | A1* | 10/2010 | Denoue et al. | 707/693 |
| 2011/0035586 | A1* | 2/2011 | Clermont et al. | 713/164 |
| 2011/0055395 | A1* | 3/2011 | Wang et al. | 709/226 |
| 2011/0138442 | A1* | 6/2011 | Vinberg et al. | 726/1 |
| 2011/0314467 | A1* | 12/2011 | Pearson | 718/1 |
| 2011/0321042 | A1* | 12/2011 | Yang et al. | 718/1 |
| 2012/0096206 | A1* | 4/2012 | Talamacki et al. | 710/263 |

OTHER PUBLICATIONS

Barth, et al. "Security Architecture of the Chromium Browser", Stanford Technical Report, Sep. 2008.*

* cited by examiner

*Primary Examiner* — Nathan Flynn
*Assistant Examiner* — Sarah Su
(74) *Attorney, Agent, or Firm* — Sterne, Kessler, Goldstein & Fox P.L.L.C.

(57) ABSTRACT

Methods and systems for sharing a security model with heterogeneous virtual machines (VMs) are provided. A method for sharing a security model with heterogeneous VMs may include making a direct function call to an object model from each of two or more heterogeneous VMs using a direct binding generated for the respective VM based on the respective VM and a security policy. The direct bindings of the two or more heterogeneous VMs share the security policy. The method may also include ensuring only one of the two or more heterogeneous VMs interacts with the object model at a time. A system for sharing a security model with heterogeneous VMs may include a heterogeneous VM manager and a heterogeneous VM scheduler. The system may further include a principal tracker and a proxy component.

17 Claims, 4 Drawing Sheets

HETEROGENEOUS VIRTUAL MACHINES SHARING A SECURITY MODEL

CROSS REFERENCE TO RELATED APPLICATIONS

This application claims the benefit of U.S. Provisional Appl. No. 61/421,162, filed Dec. 8, 2010, which is hereby incorporated by reference in its entirety.

TECHNICAL FIELD

The field relates to web browsers, web applications and security.

BACKGROUND

A Virtual Machine (VM) executes software programs as if it were a physical machine. The programs that are executed by the VM are limited to the resources provided by the VM. Applications use security models to control outside program access to internal resources. For some programs, or principals, a model may be used to represent a set of objects that untrusted principals interact with. For example, web browsers use a Document Object Model (DOM) to represent web pages that can be manipulated by principals written in a scripting language. These untrusted programs may be subject to a security policy that restricts which objects they can interact with. These security policies are partly enforced by bindings that control what resources are accessible to a VM. For example, a binding for a scripting program allows access only to DOM elements from the same origin as the page containing the scripting program (same origin policy).

A problem arises if multiple heterogeneous VMs are to interact with the same model. Heterogeneous VMs refer to VMs for different languages that may interact differently with a security model, or require different ways to enforce security. For example, a Python® VM may interact with the DOM in a different way than a JavaScript® VM. Each VM interacts with the model in different ways with potentially different programming languages or execution formats, but the programs running on the VMs must remain subject to the same security policy. However, the security policy cannot be fully enforced within the model itself, because the restrictions it enforces must take into account which VM, or principal running in a VM, is active at a given time. In contrast, plugins must implement their own security policies for interactions with elements in the DOM, leading to potential differences between security models.

Also, plugins have indirect and incomplete bindings to the DOM. For example, in order for a plugin to interact with DOM elements on the same web page or alongside a scripting program, a separate operating process may have to make an indirect call out to the layout engine that implements the DOM, which then sends instructions to other elements in the webpage.

BRIEF SUMMARY

The embodiments described below relate to sharing a security model with heterogeneous virtual machines (VMs).

According to an embodiment, a method for sharing a security model with heterogeneous VMs may include making a direct function call to an object model from each of two or more heterogeneous VMs using a direct binding generated for the respective VM based on the respective VM and a security policy. The direct bindings of the two or more heterogeneous VMs share the security policy. The method may also include ensuring only one of the two or more heterogeneous VMs interacts with the object model at a time.

According to a further embodiment, a method for sharing a security model with heterogeneous VMs may include determining security logic for binding each of a plurality of heterogeneous VMs to a security model. The method may further include generating a direct binding for each of the plurality of heterogeneous VMs based on the determined security logic for the respective heterogeneous VM. The plurality of heterogeneous VMs may use the direct bindings to share the security model. In some cases, each VM may use its own customized direct binding. In other cases, VMs may use a generic binding.

According to another embodiment, a system for sharing a security model with heterogeneous VMs may include a heterogeneous VM manager configured to create two or more heterogeneous VMs. Each of the two or more heterogeneous VMs makes a direct function call to an object model using a direct binding. A direct binding is generated for each VM based on the VM and a security policy. The direct bindings of the two or more heterogeneous VMs share the security policy. The system may also include a heterogeneous VM scheduler configured to ensure only one of the two or more heterogeneous VMs interacts with the object model at a time.

Further embodiments, features, and advantages of the invention, as well as the structure and operation of the various embodiments of the invention are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
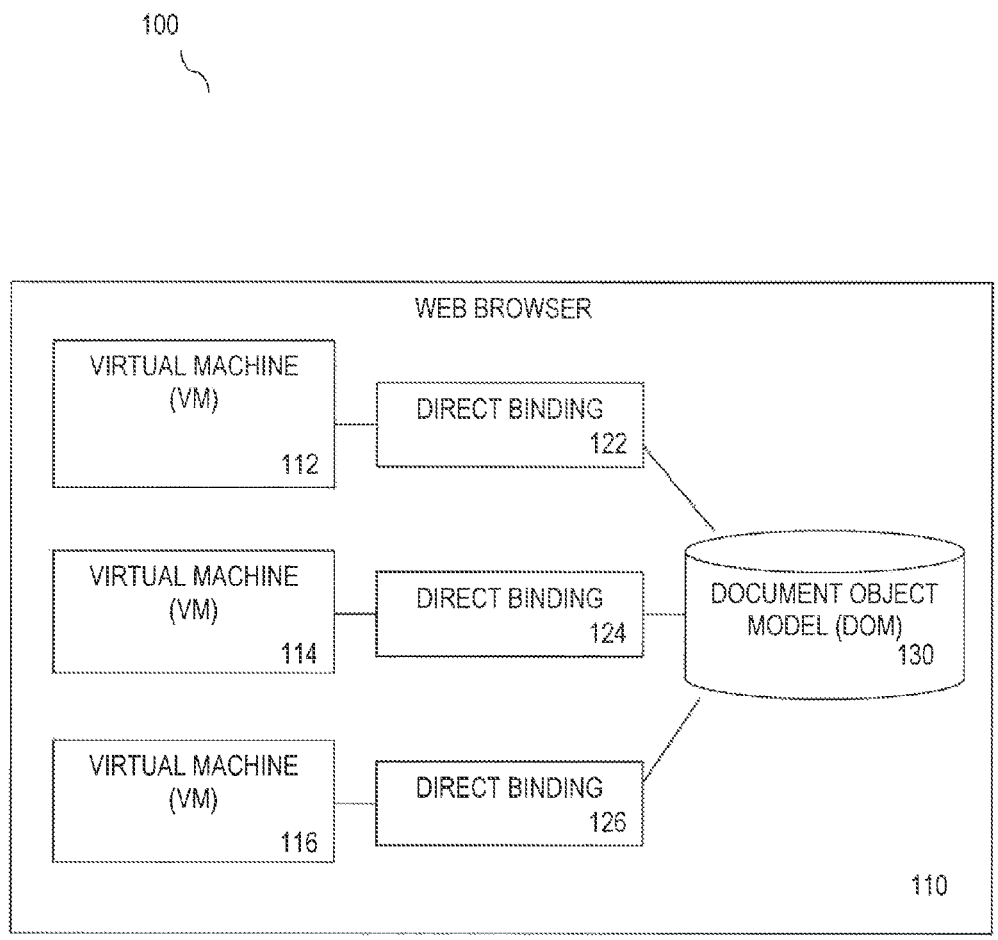
FIG. 1 illustrates a diagram of a system for sharing a security model with heterogeneous virtual machines (VMs) according to an embodiment.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Problems arise if multiple heterogeneous virtual machines (VMs) are to interact with the same model. An object model is a representation of objects in a computer program, such as a Document Object Model (DOM).

Each VM binds to the model in different ways, but the programs running on the VMs must remain subject to the same security policy, which cannot be fully enforced within the model itself. Web browser plugins like Java™ applets, Adobe Flash® plugins, and Microsoft Silverlight™ plugins face similar problems. Each offers a new VM that can bind to the DOM elements in a browser, interacting with web pages alongside a scripting code such as JavaScript™ code. However, such plugins face limitations in their ability to interact with the DOM. Their bindings to the DOM are indirect, less complete, and less efficient than the scripting language bindings to the DOM.

The embodiments described below relate to sharing a model with heterogeneous VMs using direct bindings. Direct bindings may provide for a VM to interact directly with a model, such as a DOM, while sharing the same security policy with other VMs or scripting language VMs.

A security policy defines how a program or principal is permitted to interact with the model. For example, the Same Origin Policy for web browsers allows script code in one page to access objects in another page if the two pages have the same origin, and it restricts script code in one page from accessing objects in another page if the two pages have different origins.

A binding is a link between an object or function in one execution context to an object or function in the underlying model. For example, when a JavaScript program reads the value of the document.cookie object in the JavaScript execution context, a binding provides the underlying value of the document's cookie. A direct binding refers to a binding that connects an execution context and model synchronously and in the same address space (as opposed to asynchronously passing messages across OS processes). A direct binding allows a program or principal to interact with an object model. For example, JavaScript programs in web browsers have direct bindings to the Document Object Model (DOM) to allow them to access and modify the objects in a web page.

Direct bindings provide for direct method calls to a model while following security policies. Direct bindings avoid the indirect way that plugins interact with elements of a web page. In some cases, direct bindings may be generated automatically. In other cases, direct bindings may be developed by software developers.

According to an embodiment, FIG. 1 shows an example diagram 100 of multiple heterogeneous VMs (VM 112, VM 114 and VM 116), each able to interact, one at a time, with a single shared model, DOM 130. DOM 130 may be implemented in web browser 110, which is executed on a computing device. Each of the VMs may run code on behalf of mutually untrusted principals, where each principal has different privileges for interacting with objects in the model. Direct bindings 122, 124 and 126 may be created for each specific VM. In this example, each VM may share the same security policy and enforcement logic necessary to interact with DOM 130, but their respective direct bindings are customized for each specific VM. According to further embodiments, a security policy may be applied equally to each VM with minimal variation or opportunity for error.

Web client applications can deliver sophisticated user interfaces using a DOM. These may access the DOM via a scripting language. Because the application may be compiled to a scripting language, there may effectively be no distinction between the source code and the scripting code at runtime. In some embodiments, bytecode VMs, such as for Python® bytecode, and scripting code VMs may each be bound to a web browser's DOM using a direct binding. According to further embodiments, through direct bindings, principals may access the DOM of a web page through direct function calls in memory from the bytecode. This may be more efficient than scripting language bindings because the bytecode bindings need to do fewer runtime checks.

Figure 2:
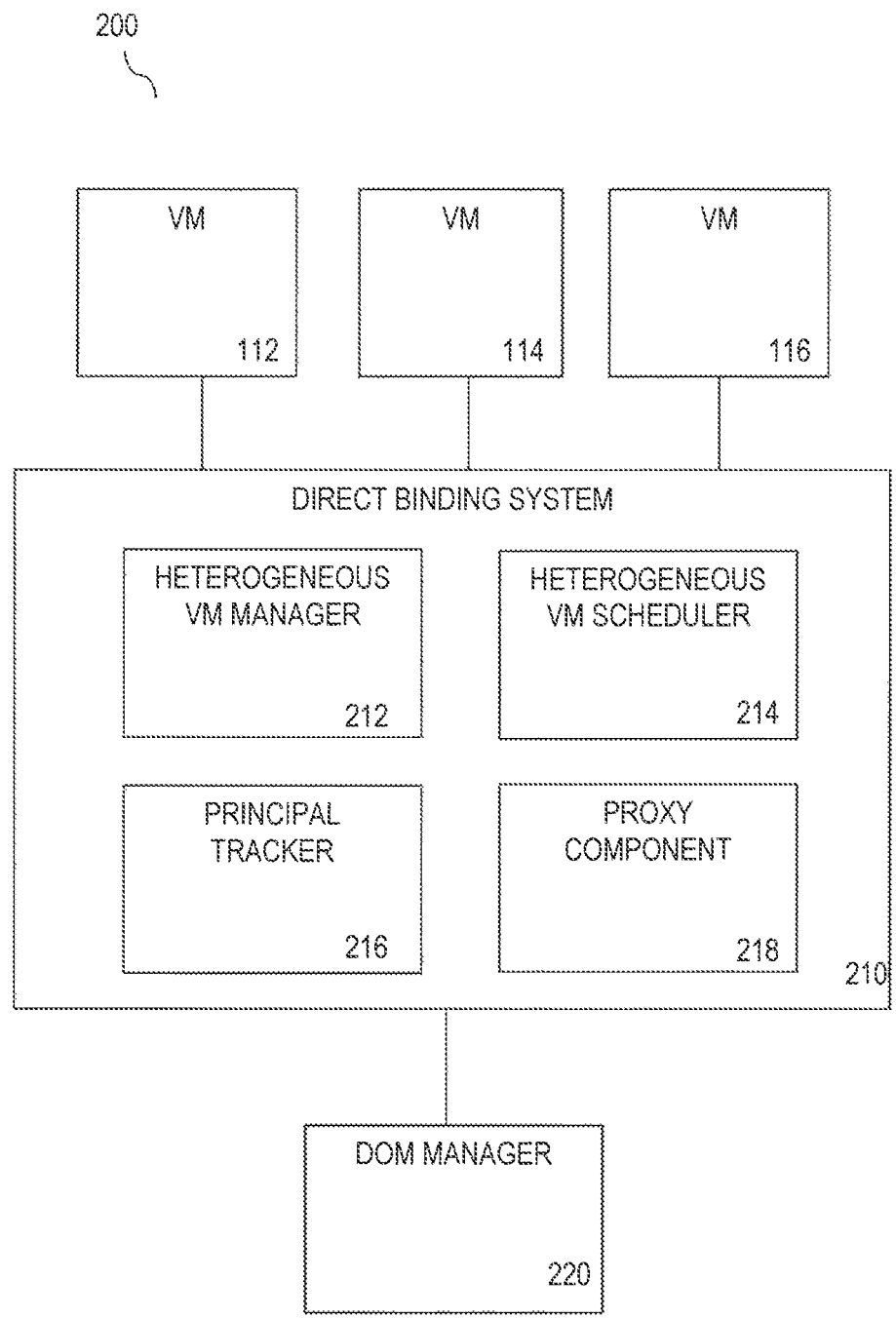
FIG. 2 illustrates an architecture diagram of a system for sharing a security model with heterogeneous VMs according to an embodiment.

FIG. 2 is an architecture diagram of exemplary system 200 for sharing a security model with heterogeneous VMs, according to an embodiment. Systems 100 and 200, or any combination of their components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

System 200 may include direct binding system 210 coupled to DOM manager 220. DOM manager 220 may manage DOMs for providing resources to principals. Although DOMs are used in this example, the embodiments are not meant to be limited to DOMs and may involve other types of models for implementing applications. According to an embodiment, direct binding system 210 may include heterogeneous VM manager 212, heterogeneous VM scheduler 114 and, in some cases, principal tracker 216 or proxy component 218. Heterogeneous VM manager 212, heterogeneous VM scheduler 114, principal tracker 216 and proxy component 218 may be implemented using hardware, software, firmware, tangible computer readable or computer usable storage media having instructions stored thereon, or a combination thereof and may be implemented in one or more computer systems or other processing systems. Direct binding system 210 may be implemented on one or more computing devices.

According to an embodiment, direct bindings may be used. Direct bindings may be generated or obtained. These direct bindings may be generated based on security logic and other necessary information from the DOM. The direct bindings may also be generated based on information specific to the internal operation of each VM, such as details specific to VM 112, VM 114 or VM 116. A direct binding may be generated for each of multiple heterogeneous VMs based on the determined security logic for the respective heterogeneous VM. In some cases, direct bindings may be generated with security logic recognizable to the respective VM. The plurality of heterogeneous VMs may share the security model with direct bindings. Direct bindings may be used to directly bind each VM to the shared DOM with the corresponding direct binding. Such embodiments give programs in each VM fast and complete access to the model's functionality. For example, Python® bindings may be added to the layout engine DOM alongside the existing scripting language bindings.

Heterogeneous VM manager 212 may be configured to create and destroy VMs that use direct bindings, according to an embodiment. Heterogeneous VM manager 212 may create two or more heterogeneous VMs where each of the two or more heterogeneous VMs makes a direct function call to an object model using a direct binding. The direct binding may be generated for the VM based on the VM and a security policy. The direct bindings of the two or more heterogeneous VMs share the security policy.

According to a further embodiment, heterogeneous VM scheduler 214 may be configured to ensure only one of the two or more heterogeneous VMs interacts with the object model at a time.

Some security decisions may depend on which principal initiated the current event, regardless of which principal is currently at the top of the execution stack. For example, some web browsers may prevent popup windows unless the stack of execution contexts begins with a user-initiated action, such as clicking a button. However, the stack may include execution contexts from multiple VMs (e.g., if Python® code causes JavaScript® code to be invoked). According to an embodiment, direct calls from one VM to another may be prevented, requiring an event boundary between the execution contexts of separate VMs. For example, Python® code causes JavaScript® code to run by calling the DOM's dispatchEvent method to invoke a scripting event listener, but not by directly calling a scripting function. As a result, each VM can independently keep track of which principal initiated the current event. In the earlier example, JavaScript® code that is invoked via dispatchEvent by Python® code (which is not a user-initiated action) cannot open a popup window, even if the earlier Python® code was invoked by a user-initiated action. This allows each VM to make security decisions independent of which other VMs have execution contexts on the stack. In some embodiments, management components of binding system 210, such as heterogeneous VM scheduler 214 or principal tracker 216, may assist with these operations.

According to an embodiment, heterogeneous VM scheduler 214 may coordinate the interaction of multiple VMs with a model, such as a DOM. Many security decisions for allowing or disallowing interactions with objects in the model depend on which principal is currently active. A single principal may interact with the model at a given time by restricting model interactions to a single thread of execution, and multiplexing that single thread among the multiple VMs. Each VM must thus take tarns in accessing objects in the model, ensuring that the security policy can be applied correctly to a single VM's principal. Note that the VMs may have other active threads of execution, as long as they do not interact with the shared model. Together, these components allow multiple heterogeneous VMs to share a single security policy while interacting directly with a shared model.

Much of the security policy may be typically implemented in the bindings between the VM and the model, where it can restrict access to the model based on the principal currently running in the VM. According to an embodiment, a generic binding may be created to contain most of the security enforcement logic. The generic bindings can restrict access to objects in the model based on which principal is active. They can be used by each of the VMs without having to implement separate (and possibly differing) security logic for each VM.

Because each VM may keep track of principals in different ways, the security logic in the generic bindings must query the VM for which principal is active. This can be done using data structures shared among all VMs. According to an embodiment, direct binding system 210 may include principal tracker 216. Principal tracker 216 may be configured to query heterogeneous VMs for which principal is active. In some cases, the same data structure may be used. VMs may also use similar representations so that they may be recognized by the other VMs. In a further embodiment, principal tracker 216 may track a currently active principal using an event listener.

Binding system 210 may include proxy component 218, according to another embodiment. Proxy component 218 may include a stack of VM contexts to determine which principal is active based on which VM is active. The shared model may encounter situations when it needs to make security decisions based on the currently active principal. For example, a layout engine may need to determine whether the currently active principal is permitted to navigate to a uniform resource locator (URL) that causes script code to be invoked. Because the active principal depends on which VM is currently active, a layout engine may query proxy component 218 for the active principal.

Figure 3:
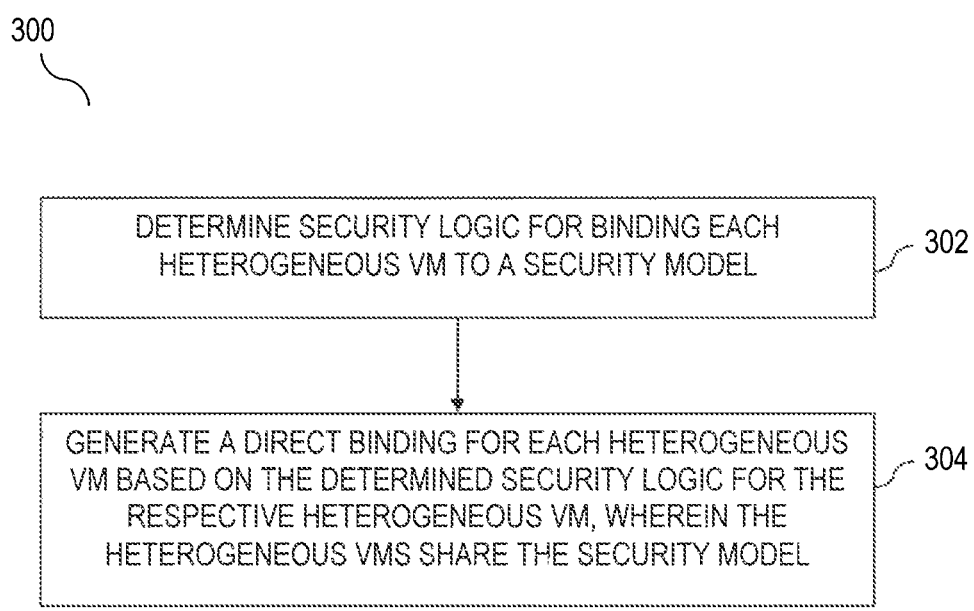
FIG. 3 illustrates a flowchart of a method for generating direct bindings for sharing a security model with heterogeneous VMs according to an embodiment.

FIG. 3 is a flowchart of exemplary method 300 for generating direct bindings for sharing a security model with heterogeneous virtual machines (VMs), according to an embodiment. While method 300 is described with respect to an embodiment, method 300 is not meant to be limiting and may be used in other applications.

As shown in FIG. 3, exemplary method 300 begins at step 302 where security logic is determined for binding each heterogeneous VM to a security model. Security logic may be determined by obtaining information about the VM either from the VM or from the DOM. Some information may be determined by analyzing communications between the VM and DOM. Information may also be determined from analyzing existing bindings. Step 302 may be performed by software developers or implemented automatically by a logic determiner.

At step 304, a direct binding is generated for each heterogeneous VM based on the determined security logic for the respective heterogeneous VM. The heterogeneous VMs share the security model. In some cases, bindings may be compiled based on a set of rules established for creating direct bindings. Rules may also provide for creating generic bindings. These rules may determined what amount of security logic overlap may be appropriate.

Figure 4:
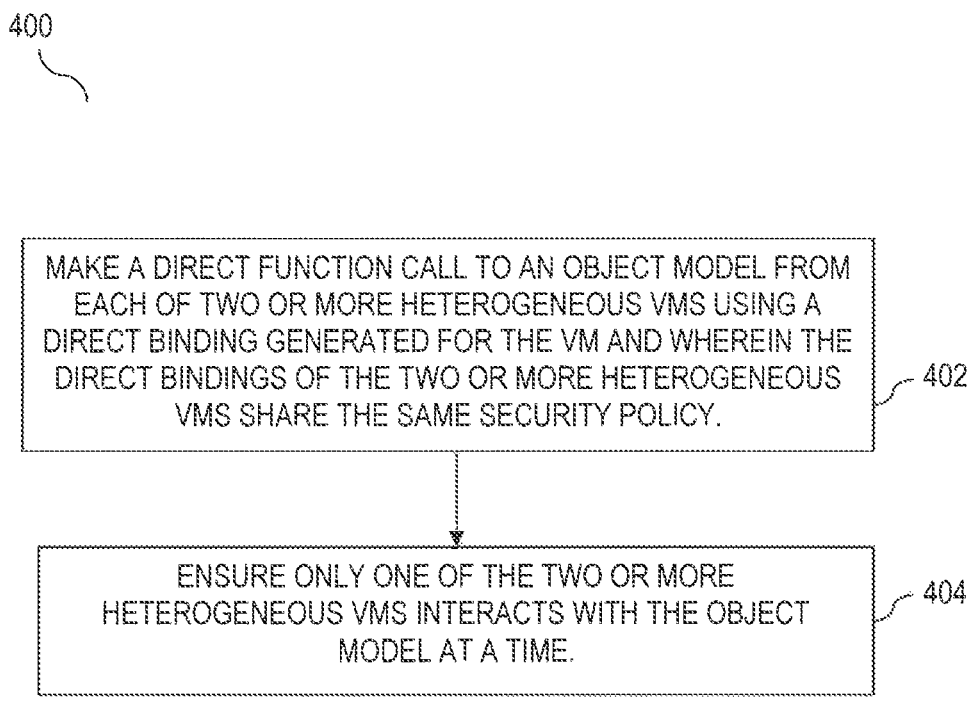
FIG. 4 illustrates a flowchart of a method for sharing a security model with heterogeneous VMs according to an embodiment.

FIG. 4 is a flowchart of exemplary method 400 for sharing a security model with heterogeneous VMs, according to an embodiment. While method 400 is described with respect to an embodiment, method 400 is not meant to be limiting and may be used in other applications. In an example, method 400 may be used to provide applications using systems 100 and/or 200 of FIGS. 1 and 2. However, method 400 is not meant to be limited to systems 100 and 200.

As shown in FIG. 4, exemplary method 400 begins at step 402 where a direct function call is made to an object model from each of two or more heterogeneous VMs using a direct binding generated for the respective VM. The direct binding may be generated based on the respective VM and a security policy. However, each of the direct bindings of the two or more heterogeneous VMs share the same security policy. Step 402 may be implemented by heterogeneous VM manager 212.

Step 404 may involve ensuring only one of the two or more heterogeneous VMs interacts with the object model at a time. This may be done using techniques explained above. Step 404 may be implemented by heterogeneous VM scheduler 214.

Further implementations are discussed below. In some implementations, a single binding class may have some methods that are implemented by the different bindings. In this case, compile-time dispatch may be achieved instead of runtime dispatch. In other implementations, shared code may refer to a binding subclass. That way, the bindings may override whatever methods they need without incurring a virtual method call.

In further implementations, template namespaces may be used. For example, a template such as template<classname Bindings> may refer to Bindings::State in a class. The template approach provides flexibility while still providing for compile-time dispatch. In other implementations, a non-template base class may be used. This class may implement its methods in its own source code file.

According to an embodiment, security functions may be shared by various language bindings. Binding system 210 may check if the active execution context can access the target frame. Binding system 210 may also check if it is safe to access a given node from a current security context. Binding system 210 may also check if the current DOM security context can access the target.

The core of the same origin policy may be enforced in a class that has methods that are called from both a layout engine and various language bindings. Security-relevant code may be shared with bindings using new generic bindings in the layout engine. In most cases, the same origin policy is enforced by a binding access object. These checks may be inserted both manually (into custom bindings) and via code generation scripts (into generated bindings).

These checks will enforce the reference monitor for source code calls into the DOM. They will ensure that attempts to access or call methods on cross-origin DOM objects will be rejected, based on the origin of the document hosting the source code. According to a further embodiment, a stronger isolation of references may be provided using a separate bytecode isolate for each frame, allowing no bytecode references between pages.

Aspects of the embodiments for exemplary systems 100-200, such as heterogeneous VM manager 212, heterogeneous VM scheduler 114, principal tracker 216 and proxy component 218, and/or methods 300-400 or any part(s) or function (s) thereof may be implemented using hardware, software modules, firmware, tangible computer readable or computer usable storage media having instructions stored thereon, or a combination thereof and may be implemented in one or more computer systems or other processing systems.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for sharing a security model with heterogeneous virtual machines (VMs) comprising:
    making, with a computing device, a direct function call to an object model from each of two or more heterogeneous VMs, each heterogeneous VM using a different programming language and using a direct binding generated for the respective VM based on the respective VM and a security policy, wherein the direct bindings of the two or more heterogeneous VMs share the security policy that restricts access to at least a portion of the object model and wherein each heterogeneous VM has different privileges for interacting with the object model as provided by the shared security policy; and
    ensuring only one of the two or more heterogeneous VMs interacts with the object model at a time.

2. The method of claim 1, wherein the object model is a Document Object Model (DOM).

3. The method of claim 1, wherein using the direct binding includes using a single generic binding for each of the two or more heterogeneous VMs, wherein the generic binding is generated based on security logic of the security policy common to the two or more heterogeneous VMs.

4. The method of claim 1, further comprising determining an active principal of the two or more heterogeneous VMs based on a querying of at least one of the two or more heterogeneous VMs.

5. The method of claim 1, further comprising determining an active principal of the two or more heterogeneous VMs based on which VM is active in a proxy having a stack of VM contexts.

6. The method of claim 1, further comprising preventing direct calls between VMs of the two or more heterogeneous VMs with an event boundary between execution contexts of the two or more heterogeneous VMs.

7. The method of claim 1, wherein ensuring further comprises restricting security model interactions to a single execution thread and multiplexing the single thread among the two or more heterogeneous VMs.

8. The method of claim 1, wherein the direct bindings provide for synchronous access to the object model without passing messages across another operating system process.

9. A computer-implemented method for sharing a security model with heterogeneous virtual machines (VMs) comprising:
    determining security logic for binding each of a plurality of heterogeneous VMs to a security model, each heterogeneous VM using a different programming language; and
    generating, with a computing device, a direct binding for each of the plurality of heterogeneous VMs based on the determined security logic for the respective heterogeneous VM, wherein the plurality of heterogeneous VMs share the security model and wherein each heterogeneous VM has different privileges for interacting with the object model as provided by the shared security policy.

10. The method of claim 9, wherein determining includes determining security logic common to each of the plurality of heterogeneous VMs and wherein generating includes generating a generic binding for use by each of the plurality of heterogeneous VMs based on the common security logic.

11. A system for sharing a security model with heterogeneous virtual machines (VMs) comprising:
    a heterogeneous VM manager, implemented with a computing device and configured to create two or more heterogeneous VMs, wherein each of the two of more heterogeneous VMs uses a different programming language and makes a direct function call to an object model using a direct binding generated for the respective VM based on the respective VM and a security policy and wherein the direct bindings of the two or more heterogeneous VMs share the security policy and wherein each heterogeneous VM has different privileges for interacting with the object model as provided by the shared security policy; and
    a heterogeneous VM scheduler configured to ensure only one of the two or more heterogeneous VMs interacts with the object model at a time.

12. The system of claim 11, wherein the object model is a Document Object Model (DOM).

13. The system of claim 11, wherein each of the direct bindings of the two or more heterogeneous VMs is the same generic binding generated based on security logic of the security policy common to the two or more heterogeneous VMs.

14. The system of claim 11, wherein the VM scheduler is further configured to prevent direct calls between VMs of the two or more heterogeneous VMs with an event boundary between execution contexts of the two or more heterogeneous VMs.

15. The system of claim 11, wherein the heterogeneous VM scheduler is further configured to restrict security model interactions to a single execution thread and multiplexing the single thread among, the two or more heterogeneous VMs.

16. The system of claim 11, further comprising a principal tracker configured to query at least one of the two or more heterogeneous VMs to determine which principal of the two or more heterogeneous VMs is active.

17. The system of claim 11, further comprising a proxy component having a Stack of VM contexts to determine which principal of the two or more heterogeneous VMs is active based on which VM is active.

\* \* \* \* \*